(12) United States Patent
Wiklund (10) Patent No.: US 9,250,108 B2
(45) Date of Patent: Feb. 2, 2016

(54) DIFFERENTIAL PRESSURE BASED FLOW MEASUREMENT DEVICE HAVING IMPROVED PITOT TUBE CONFIGURATION

(71) Applicant: Rosemount Inc., Chanhassen, MN (US)

(72) Inventor: David Eugene Wiklund, Eden Prairie, MN (US)

(73) Assignee: Rosemount Inc., Chanhassen, MN (US)

( * ) Notice: Subject to any disclaimer, the term of this patent is extended or adjusted under 35 U.S.C. 154(b) by 118 days.

(21) Appl. No.: 14/039,006

(22) Filed: Sep. 27, 2013

(65) Prior Publication Data

US 2015/0090050 A1    Apr. 2, 2015

(51) Int. Cl.
*G01F 1/46* (2006.01)
*G01F 1/37* (2006.01)

(52) U.S. Cl.
CPC ... *G01F 1/46* (2013.01); *G01F 1/37* (2013.01)

(58) Field of Classification Search
CPC .............. G01F 1/46; G01P 5/16; G01P 5/165
USPC .......................................... 73/861.65; 702/50
See application file for complete search history.

(56) References Cited

U.S. PATENT DOCUMENTS

| | | | |
|---|---|---|---|
| 3,589,185 A | 6/1971 | Burgess | |
| 3,719,073 A * | 3/1973 | Mahon | 73/861.22 |
| 3,765,241 A | 10/1973 | Lambert | |
| 3,948,097 A | 4/1976 | Kurita et al. | |
| 4,030,355 A | 6/1977 | Herzl | |
| 4,052,895 A | 10/1977 | Herzl et al. | |
| 4,116,058 A | 9/1978 | Herzl et al. | |
| 4,181,020 A | 1/1980 | Herzl | |
| 4,226,117 A | 10/1980 | Herzl | |
| 4,297,898 A | 11/1981 | Herzl | |
| 4,445,388 A | 5/1984 | Herzl et al. | |
| 4,448,081 A * | 5/1984 | Kolitsch et al. | 73/861.03 |
| 4,561,311 A | 12/1985 | Keyes et al. | |
| 4,703,661 A | 11/1987 | Evers | |
| 4,957,007 A | 9/1990 | Gray | |
| 5,963,147 A | 10/1999 | Westfield et al. | |
| 5,969,266 A | 10/1999 | Mahoney et al. | |

(Continued)

FOREIGN PATENT DOCUMENTS

CN      101336368     12/2008
EA      200870032     4/2009

(Continued)

OTHER PUBLICATIONS

Notification of Transmittal of the International Search Report and the Written Opinion of the International Searching Authority from PCT/US2014/049556, dated Oct. 30, 2014.

*Primary Examiner* — Lisa Caputo
*Assistant Examiner* — Nathaniel T Woodward
(74) *Attorney, Agent, or Firm* — Westman, Champlin & Koehler, P.A.

(57) ABSTRACT

A differential pressure flow measurement system includes a pressure sensor coupled to measurement circuitry. An elongate probe is configured to be inserted into a conduit which carries a flow of process fluid. The pressure sensor senses a pressure difference in the fluid flow generated as the fluid flows past the probe. A vortex shedding stabilizer is positioned proximate the elongate probe and in the flow of process fluid. The vortex shedding stabilizer is configured to stabilize vortex shedding in the flow of fluid proximate the elongate probe.

29 Claims, 9 Drawing Sheets

(56) References Cited

U.S. PATENT DOCUMENTS

| | | |
|---|---|---|
| 6,089,097 A | 7/2000 | Frick et al. |
| 6,119,047 A | 9/2000 | Eryurek et al. |
| 6,170,338 B1 | 1/2001 | Kleven et al. |
| 6,220,103 B1 | 4/2001 | Miller et al. |
| 6,321,166 B1 | 11/2001 | Evans et al. |
| 6,470,755 B1 | 10/2002 | Beachey et al. |
| 6,901,803 B2 | 6/2005 | Fandrey |
| 7,258,024 B2 | 8/2007 | Dimarco et al. |
| 7,308,832 B1 | 12/2007 | Ifft |
| 7,836,780 B2 | 11/2010 | Granett et al. |
| 8,056,409 B2 | 11/2011 | Steven |
| 8,424,396 B2 | 4/2013 | Knight |
| 8,578,783 B2 | 11/2013 | Hedtke et al. |
| 2004/0187598 A1 | 9/2004 | Shiba et al. |
| 2008/0307901 A1 | 12/2008 | Knight |
| 2009/0211368 A1 | 8/2009 | Garnett et al. |
| 2011/0054822 A1 | 3/2011 | Bauschke et al. |

FOREIGN PATENT DOCUMENTS

| | | | |
|---|---|---|---|
| EA | 015862 | | 12/2011 |
| GB | 1 482 699 | | 8/1977 |
| GB | 2065884 A | * | 7/1981 |
| GB | 2 433 116 | | 6/2007 |
| GB | 2 433 122 | | 6/2007 |
| WO | WO 01/11321 | | 2/2001 |
| WO | WO 2007/066128 | | 6/2007 |

* cited by examiner

FIG. 6

DIFFERENTIAL PRESSURE BASED FLOW MEASUREMENT DEVICE HAVING IMPROVED PITOT TUBE CONFIGURATION

BACKGROUND

The present invention relates to measuring flow of process fluid in industrial processes. More specifically, the present invention relates to measuring flow using an averaging pitot tube using differential pressure.

The process industry employs process variable transmitters to monitor process variables associated with substances such as solids, slurries, liquids, vapors, and gases in chemical, pulp, petroleum, pharmaceutical, food and other processing plants. Process variables include pressure, temperature, flow, level, turbidity, density, concentration, chemical composition and other properties. A process flow transmitter provides an output related to a sensed process fluid flow. The flow transmitter output can be communicated over a process control loop to a control room, or the output can be communicated to another process device such that operation of the process can be monitored and controlled.

Measuring the rate of fluid flow in a confined conduit by modifying the internal geometry of the conduit and applying an algorithm to the measured differential pressure in the flowing fluid, is known. The geometry of the conduit is traditionally changed by altering the cross section of the conduit, such as with a venturi meter, or by the insertion into the conduit of a flow altering device such as a orifice plate, an averaging pitot tube or the like.

An averaging pitot tube generally includes a body that slightly impedes fluid flow within the conduit. A pressure difference between the upstream side and the downstream side of the pitot tube is measured and correlated to flow rate. However, variations in the differential pressure may cause inaccuracies in the flow rate determination.

SUMMARY

A differential pressure flow measurement system includes a pressure sensor coupled to measurement circuitry. An elongate probe is configured to be inserted into a conduit which carries a flow of process fluid. The pressure sensor senses a pressure difference in the fluid flow generated as the fluid flows past the probe. A vortex shedding stabilizer is positioned proximate the elongate probe and in the flow of process fluid. The vortex shedding stabilizer is configured to stabilize vortex shedding in the flow of fluid proximate the elongate probe.

DETAILED DESCRIPTION OF ILLUSTRATIVE EMBODIMENTS

As discussed in the background section, averaging pitot tube based flow sensors typically operate by generating a differential pressure in a flowing fluid. A differential pressure sensor can be used to sense this differential pressure, and the sensed pressure can be correlated to flow rate of a process fluid. It is known that more accurate flow measurements may be obtained if the upstream and downstream pressures obtained from the pitot tube are average pressures taken across the diameter of the flow tube. Although this does provide more accurate flow measurements, errors can still arise in the flow measurements due to unstable oscillations which arise in the differential pressure as the fluid moves past the probe. In particular, low frequency oscillations can be detected incorrectly as changes in the flow rate. The present invention stabilizes the vortex shedding low frequency oscillations and thereby provides more accurate flow measurement. This is described below in more detail.

Figure 1:
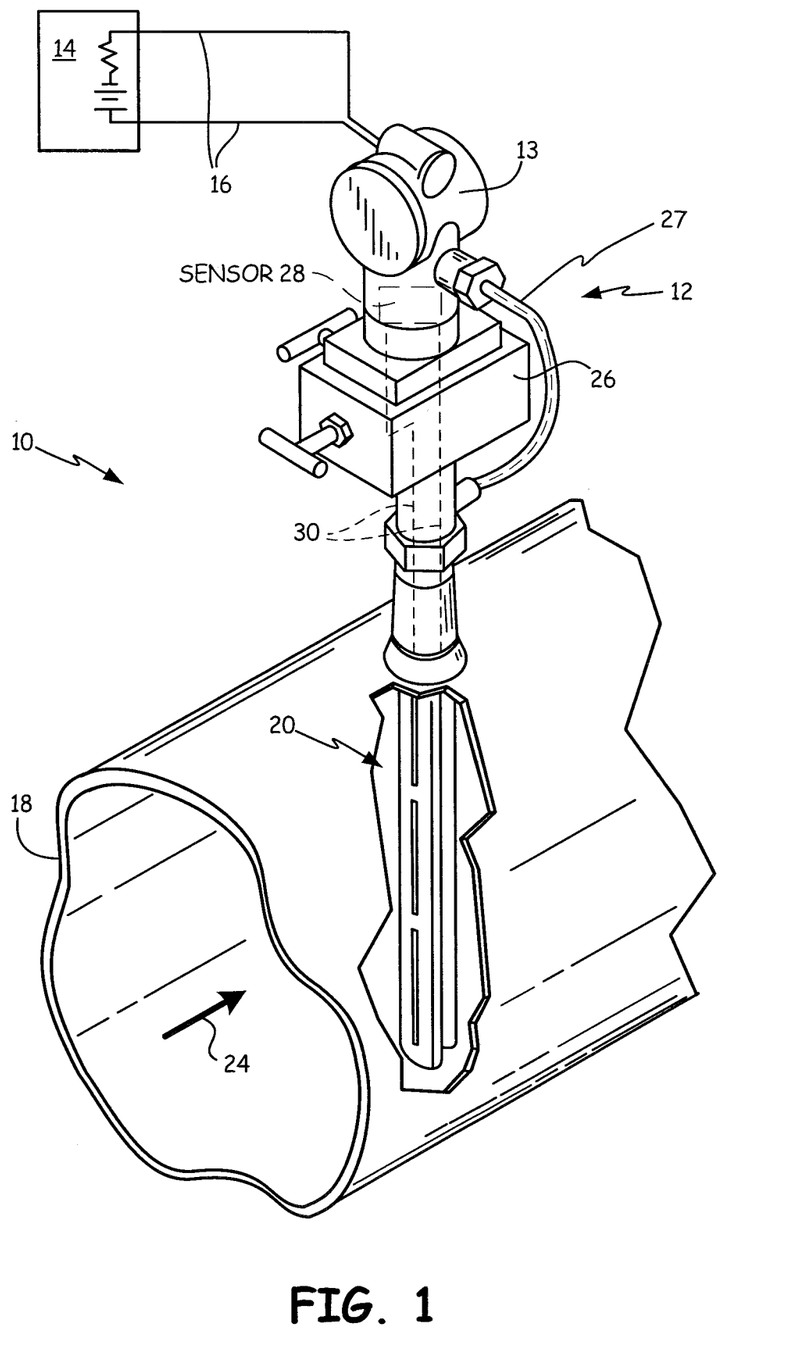
FIG. 1 shows a flow measurement system of the present invention and a cut away view of process piping.

FIG. 1 is a diagrammatic view of process control system 10 illustrating one example of an environment of embodiments of the invention. Flow measurement system 12 is coupled to control room 14 (modeled as a voltage source and resistance) through process control loop 16. Loop 16 can utilize an appropriate protocol to communicate flow information between flow transmitter 12 and control room 14. For example, process control loop 16 operates in accordance with a process industry standard protocol such as Highway Addressable Remote Transducer (HART®), FOUNDATION™ Fieldbus or any other appropriate protocol. Further, the process control loop 16 can comprise a wireless process control loop in which information is communicated wirelessly, for example, using the WirelessHART® communication protocol in accordance with the IEC 62591 Standard. Other communication techniques can be employed including Ethernet or fiberoptic connections.

FIG. 1 further shows a cut away portion of a process fluid container such as a pipe, or closed conduit, 18 into which is installed a differential pressure measuring probe 20. Probe 20 is an averaging a pitot tube which diametrically spans the inside of pipe 18. The directional arrow 24 in FIG. 1 indicates the direction of fluid flow in pipe 18. A fluid manifold 26 and flow transmitter housing 13 are shown mounted on the exterior end of pitot tube 20. Transmitter housing 13 may include a differential pressure sensor 28 that is fluidically coupled to probe 20 through passageways 30. Additionally, FIG. 1 illustrates an optional secondary sensor connection 27 which is used to connect one or more process variable sensors carried by probe 20 to circuitry within flow transmitter 13. For example, this can be used to connect to a temperature sensor. A vortex shedding stabilizer (not shown in FIG. 1) is positioned proximate the probe 20 to stabilize vortex shedding oscillations proximate the probe 20 as explained below in more detail.

Figure 2:
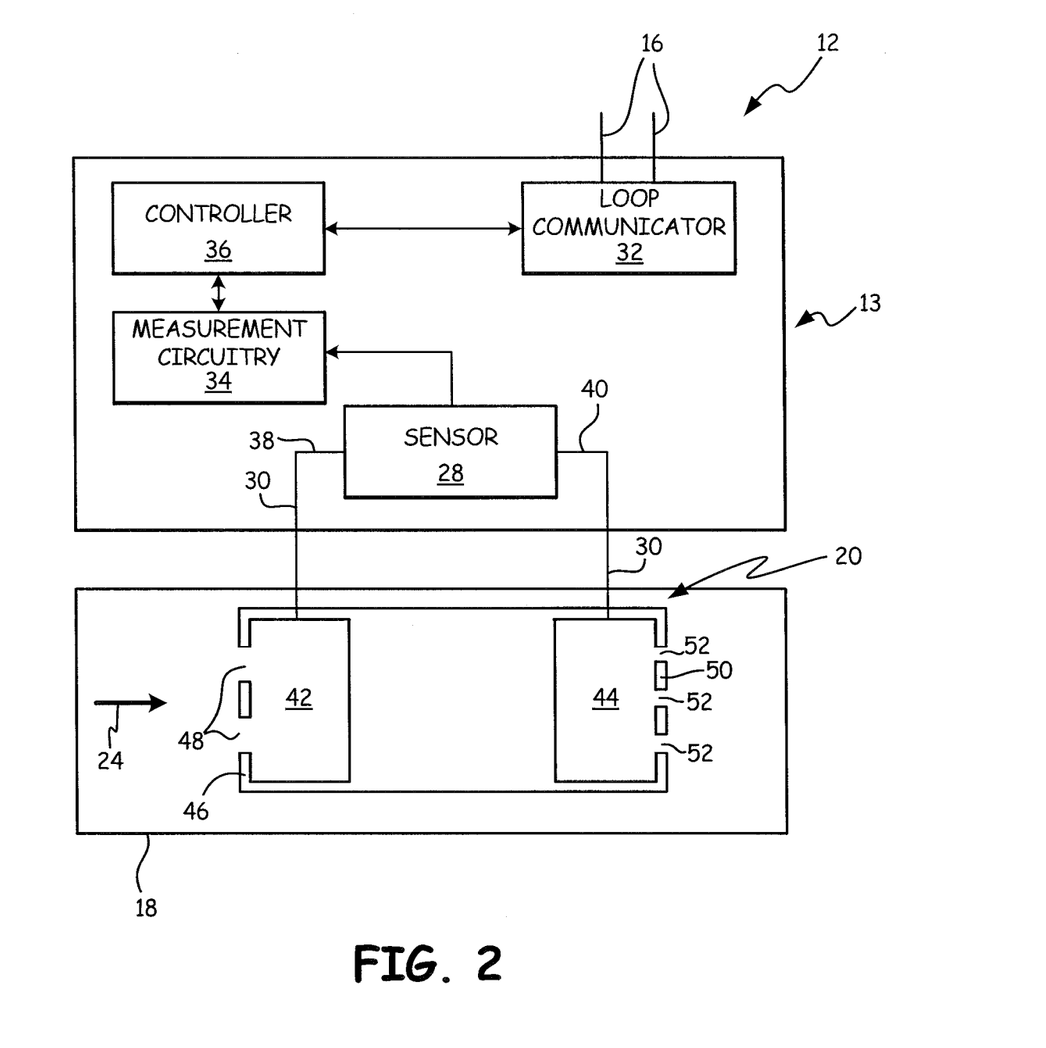
FIG. 2 is a simplified block diagram of a flow measurement system and flow transmitter in accordance with one example embodiment of the present invention.

FIG. 2 is a system block diagram of flow transmitter 12. Flow measurement transmitter 12 includes flow transmitter housing 13 and differential pressure measurement probe 20. Flow measurement transmitter 12 is coupleable to a process control loop such as loop 16 and is adapted to communicate a process variable output related to the flow of process fluid flow within pipe 18. Transmitter 12 includes a loop communicator 32, differential pressure sensor 28, measurement circuitry 34, and controller 36.

Loop communicator 32 is coupleable to a process control loop, such as loop 16, and is adapted to communicate upon the process control loop. Such communication can be in accordance with any appropriate process industry standard protocol; such as the protocols discussed above.

First and second ports 38, 40 are coupled to respective first and second plenums 42, 44 of probe 20 through passageways 30. Sensor 28 can be any device that has an electrical characteristic that changes in response to changes in applied pressure. For example, sensor 28 can be a capacitive pressure sensor in which the capacitance changes in response to the differential pressure applied between ports 38 and 40. Other measurements techniques can also be used.

Measurement circuitry 34 is coupled to sensor 28 and is configured to provide a sensor output related to differential pressure between ports 38 and 40. Measurement circuitry 34 can be any electronic circuitry that can provide a suitable signal related to differential pressure. For example, measurement circuitry 34 can be an analog-to-digital converter, a capacitance-to-digital converter or any other appropriate circuitry.

Controller 36 is coupled to measurement circuitry 34 and loop communicator 32. Controller 36 is adapted to provide a process variable output to loop communicator 32 which is related to the sensor output provided by measurement circuitry 34. Controller 36 can be a microprocessor, or any other appropriate device. Typically, controller 36 will convert the differential pressure into an output that is related to flow rate of the process fluid. The controller 36 may perform compensation, for example, using curve fitting techniques or the like to adjust for non-linearities in the relationship between differential pressure and flow rate. Additional factors can be used to compensate the flow rate measurements including compensating for variations due to temperature, the process fluid being sensed, absolute pressure, etc.

Although loop communicator 32, measurement circuitry 34 and controller 36 have been described with respect to individual modules, it is contemplated that they can be combined such as on an Application Specific Integrated Circuit (ASIC). Similarly, various software components in a microprocessor based system can implement aspects of measurement circuitry 34, controller 36 and loop communicator 32.

Differential pressure measurement probe 20 is coupled to transmitter housing 13 by passageways 30. Thus, port 38 of sensor 28 is coupled to first plenum 42, while port 40 of sensor 28 is coupled to second plenum 44. A "plenum" is a passageway, a channel, a tube or the like into which fluid of a particular character or pressure is directed or admitted and through which the fluid pressure is conducted or conveyed.

In the illustrated embodiment, first (upstream) plenum 42 includes at least one impact aperture 48 and is disposed to communicate pressure from the probes impact (or upstream) surface 46 to port 38 of sensor 28. Aperture 48 may be any appropriate configuration. Aperture 48 includes a longitudinal component that, in some embodiments, can be long enough that aperture 48 (such as a slot) will be substantially aligned with the longitudinal axis of probe 20. Second (downstream) plenum 44 includes a non-impact (or downstream) surface 50 spaced downstream from impact surface 46. Non-impact surface 50 includes at least one non-impact aperture 52 disposed to communicate pressure from the non-impact surface via plenum 44 to port 40 of sensor 28. The locations of the pressures being measured are for descriptive purposes and the invention is not limited to this configuration.

As discussed in the Background section, variations in the differential pressure can cause errors in flow measurements. It has been noted that pitot tube based flowmeter such as Averaging Pitot Tube (APT) flowmeters may have a significant amount of variation in their output. An APT generates a differential pressure between its upstream and downstream sides. This can be used in the following equations to measure mass or volumetric flow rate:

$$Q\text{mass} = N \times K \times D^2 \times Y_1 \times \sqrt{DP \times \rho} \qquad \text{Equation (1)}$$

$$Q\text{volumetric} = N \times K \times D^2 \times Y_1 \times \sqrt{DP/\rho} \qquad \text{Equation (2)}$$

In Equations (1) and (2), the mass flow rate is in units of mass per unit time (kg/hr, lbs/sec, etc) and the volumetric flow rate is in units of actual volume per unit time (actual cubic ft/hour, actual cubic meters/minute, etc.). The term N is a constant conversion factor whose value is determined by the units of the various other terms in Equations (1) and (2). The variables in equations (1) and (2) are the pipe diameter, D, which is a function of temperature, the gas expansion factor, $Y_1$, which accounts for the change in density of the fluid as it changes velocity through the device and is a function of the ratio of the differential pressure and static pressure, the fluid density, p, which is a function of the static pressure and temperature, and the differential pressure (DP) which is measured between the front and rear faces of the APT. The remaining term is the flow coefficient, K. This is an empirical term that quantifies the ratio of true flow rate through the flowmeter and the theoretical flow rate through the meter. The flow coefficient may be as simple as a constant or it may be a function of the Reynolds number.

Note that K is an empirical term. The need to determine K empirically arises from the fact that the flow field around the APT exhibits separation of the flow from the leading edges of the probe 20 with a resulting highly turbulent recirculation zone on the downstream side. The pressure field in the recirculation zone has significant unstable variations which results in the variations in the differential pressure (DP). Another factor that contributes to the variations in DP (or, alternatively, in K) is that the width of the typical APT is much smaller than the pipe diameter. The net result of this is that the typical APT application involves a long, slender strut spanning the pipe. Another flow technology that has some similarities to the APT is the vortex shedding flowmeter. In this type of flowmeter, the vortex shedding body spans the pipe (similar to the APT) and has flow separation with a similar highly turbulent recirculation zone on the downstream side. A difference between the technologies is in the blockage factor. This is defined in Equation (3) below:

$$B = \frac{4 \times d}{\pi \times D} \qquad \text{Equation (3)}$$

In Equation (3), d is the width of the APT facing the incoming flow (for vortex meters it is the width of the shedding bar) and D is the pipe diameter. For vortex meters the blockage factor remains essentially the same for all meter sizes (i.e., the shedding bar width changes for each pipe size) while for APT meters a given APT can be used for a broad range of pipe sizes. For APT's, this means that the blockage factor will decrease as the pipe size increases for a given APT width. For Vortex shedding flowmeters, the blockage is held constant to exploit dynamic similarity and ensure that all meters have the same hydrodynamic characteristics. This strategy has proven to be successful for vortex meters primarily due to the fact that the vortex shedding behaves in a largely two dimensional manner. That is, despite the fact that the shedding bar spans the pipe, the spanwise effects are minimal. The vortex shedding phenomenon has been shown to remain coherent along the span so long as the spanwise length to shedding bar width ratio is between about 4:1 and 5:1. Virtually all commercial vortex meters are designed with this in mind. The separated flow field around most APT's is an indication that they are shedding vortices.

In an APT, the differential pressure is obtained by subtracting the downstream pressure (that measured in the wake zone) from the stagnation pressure on the upstream side. Both of these pressures are typically measured in the plenum chambers with multiple pressure ports that serve to average the pressure across the flow stream. Most of the differential pressure signal arises from the suction, or downstream, side. Given this, it is important to minimize fluctuations in the pressure field on the downstream side.

Figure 3A:
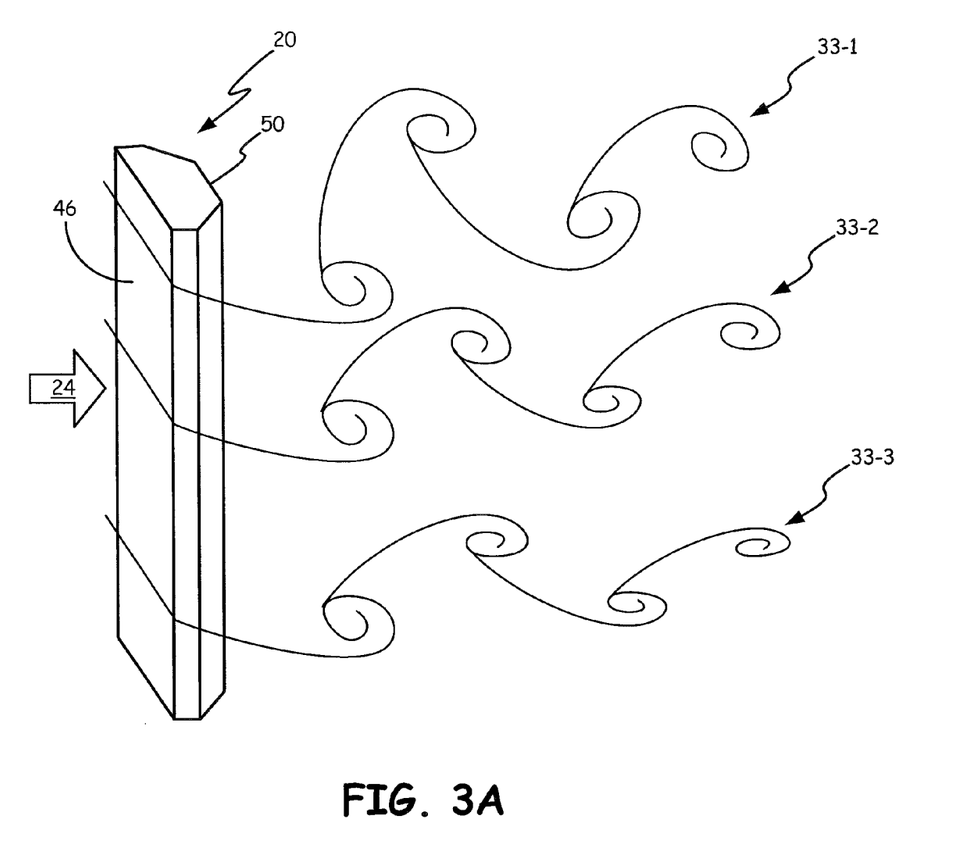
FIG. 3A is a perspective view of an averaging pitot tube and resultant vortex shedding as process fluid flows past the tube.
Figure 3B:
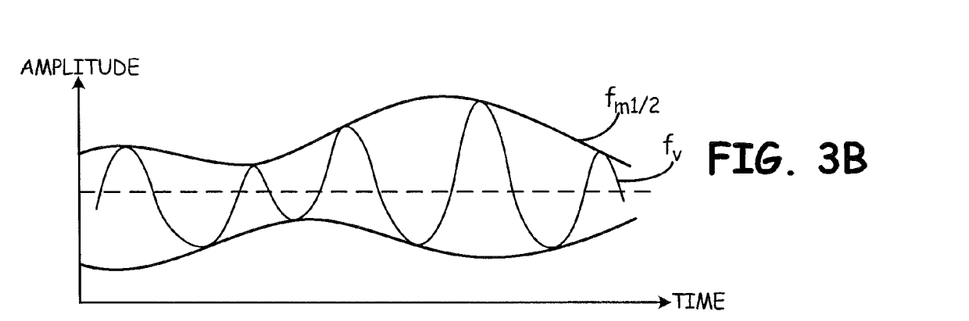
FIGS. 3B, 3D, and 3F are graphs of pressure amplitude versus time.
Figure 3C:
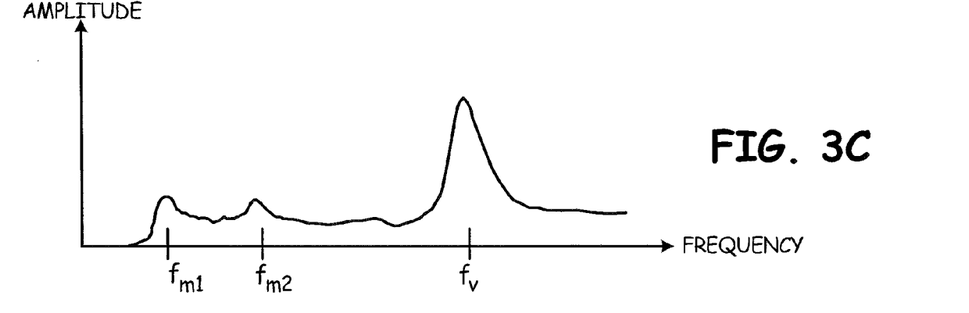
FIGS. 3C and 3E are graphs of pressure amplitude versus frequency for various vortex shedding scenarios.

The wake of an APT is heavily dominated by the vortex shedding. For smaller pipe sizes where the blockage is higher, the vortex shedding may be more uniform along the span of the APT. As the pipe size is increased and the blockage factor decreases, the coherence of the vortex shedding along the span may become less pronounced. This is analogous to what occurs in tornado formation. The sinuous shape of a forming tornado twists as it descends to the ground. In the case of the APT, the flow separation does not remain fixed along the surface of the APT. Rather, the axis of the vortices is distorted as some parts of it separate before others. The vortex shedding is not coherent along the span of the shedder. Note that the frequencies $f_{m1}$ and $f_{m2}$ may not have a discrete and recognizable frequency spectrum as shown in FIG. 3C. There may or may not be identifiable frequencies present in the pressure signal corresponding to $f_{m1}$ and $f_{m2}$. However, there will be a general widening of the vortex shedding peak as illustrated in FIG. 3C as opposed to the sharp peak illustrated in FIG. 3E.

In an APT system, there are four pressure effects that must be considered. First, the upstream pressure (stagnation pressure) will vary slightly along the span of the APT. This is due to the velocity profile in the pipe. For fully developed turbulent pipe flow, the pressure is slightly peaked in the center. Consequently, the stagnation pressure will vary along the front face of the APT. There may be some secondary flow set up in the upstream plenum chamber but it is not likely to be a dynamic effect and thus will not result in pressure variations in the measured stagnation pressure. Secondly, there is an upstream pressure that oscillates laterally upstream of the probe as the flow splits to go around either side of the probe. The other two pressure effects occur on the downstream pressure measurement. First, there are pressure fluctuations due to the vortices themselves. The vortex shedding frequency ranges from, for example, something on the order of 5 Hz to 100 Hz for liquid applications and something on the order of 100 to 1000 Hz for gas applications. The frequency response of typical differential pressure transmitters is typically such that for frequencies much over 10 Hz, the pressure fluctuations are attenuated to the point of being undetectable. Therefore, the fluctuation of the downstream pressure should only be of concern for very low velocities in liquid flow applications. Because the strength of the vortices (i.e., the magnitude of the pressure fluctuations) is related to the square of the velocity, the pressure fluctuations at low velocities becomes relatively small. Of more concern is the fluctuation in the wake pressure that will be caused by vortices that are not shed coherently along the span of the APT. This may cause pressure gradients along the rear face of the APT which could induce secondary flows in the downstream plenum chamber. Such fluctuations and/or secondary flows may be of a slowly varying and/or random nature. Such variations will manifest themselves as a low frequency oscillation in the differential pressure signal. The fixed sample rates for differential pressure transmitters will make the output of the flowmeter noisy and less repeatable.

Figure 3D:
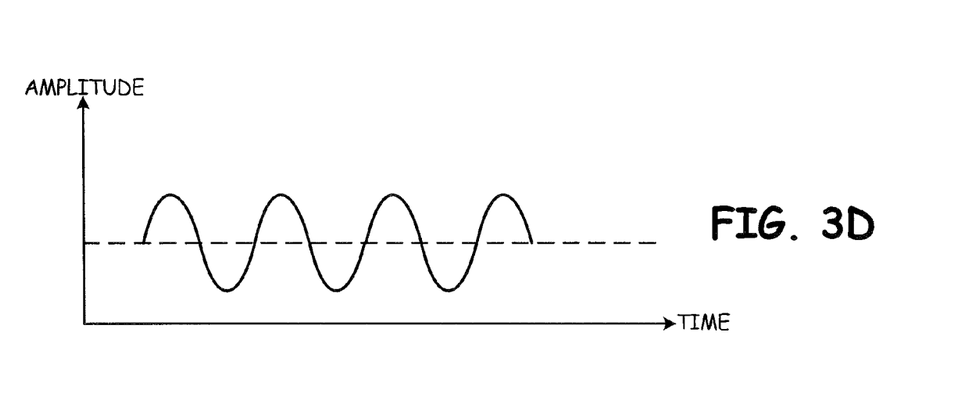
Figure 3E:
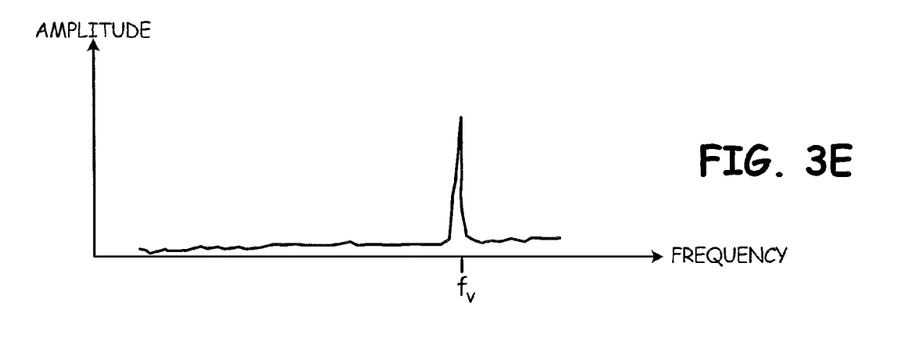

The vortices which form on the downstream side of an object in a flow have a very complex configuration which varies both with position and time. FIG. 3A is a highly simplified diagram showing trailing vortices 33-1, 33-2, and 33-3 which are formed on the trailing edge (non-impact side) 50 of probe 20. The vortices 33-1, 33-2, and 33-3 are formed at various positions along the length of probe 20. These can be viewed as individual slices through the process fluid and the actual vortices are continuously forming along the length of the probe 20 as they also move downstream (to the right side) in FIG. 3A. The individual vortices form rapidly and oscillate between either side of the probe 20. Further, the positioning, shape and timing of the vortices varies along the length of probe 20. FIG. 3B is a graph illustrating pressure amplitude versus time for vortices 33-1 shown in FIG. 3A. As shown in FIG. 3B, there is a primary vortex oscillation $f_V$ which is contained within a lower frequency envelope illustrated as $f_{m1-2}$. These frequencies are illustrated in the graph of frequency versus amplitude shown in FIG. 3C. In FIG. 3C, the low frequencies $f_{m1}$ and $f_{m2}$ are shown as well as the primary vortex shedding frequency $f_V$. Typically, $f_V$ is at a sufficiently high frequency so that it does not interfere with the pressure measurements used to determine flow rate. However, the lower frequency envelope formed by frequencies $f_{m1}$ and $f_{m2}$ may be sensed by the pressure sensor used to measure differential pressure and cause errors in flow measurements. As discussed below in more detail, a downstream element can be used to reduce the low frequency envelope that modulates the shedding frequency $f_V$ and thereby reduce errors in flow measurements. FIG. 3E is a graph of pressure amplitude versus time showing the effects on the shedding vortices when a downstream element is used. Similarly, FIG. 3E is a graph of amplitude versus frequency. As shown in FIGS. 3D and 3E, the low frequency envelope formed by frequencies $f_{m1}$ and $f_{m2}$ are eliminated. Thus, errors in the pressure measurements are reduced.

Figure 3F:
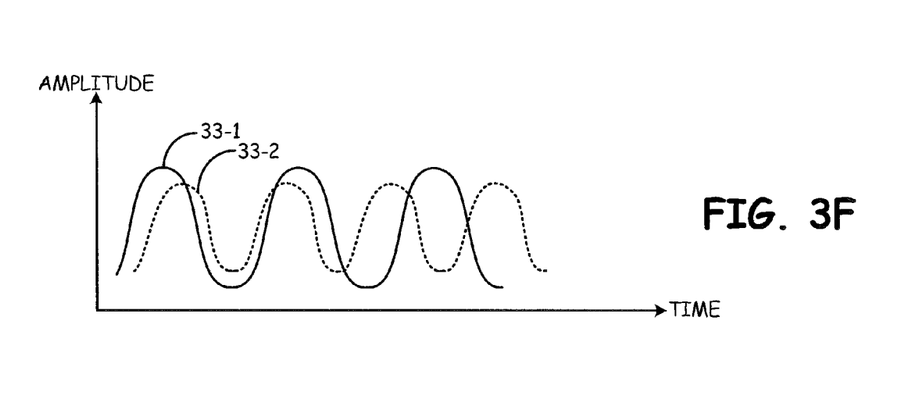
Figure 4A:
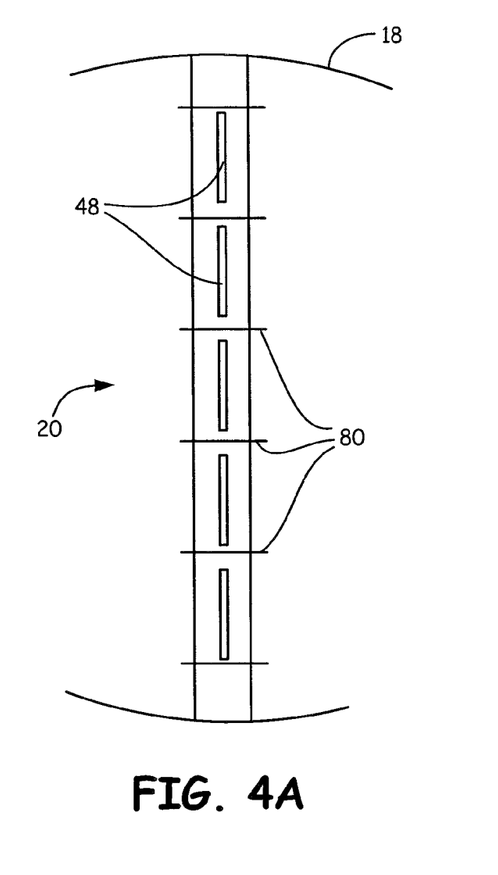
FIG. 4A is a front plan view of an averaging pitot tube shown in FIG. 1 and illustrates example boundary layer fences.
Figure 4B:
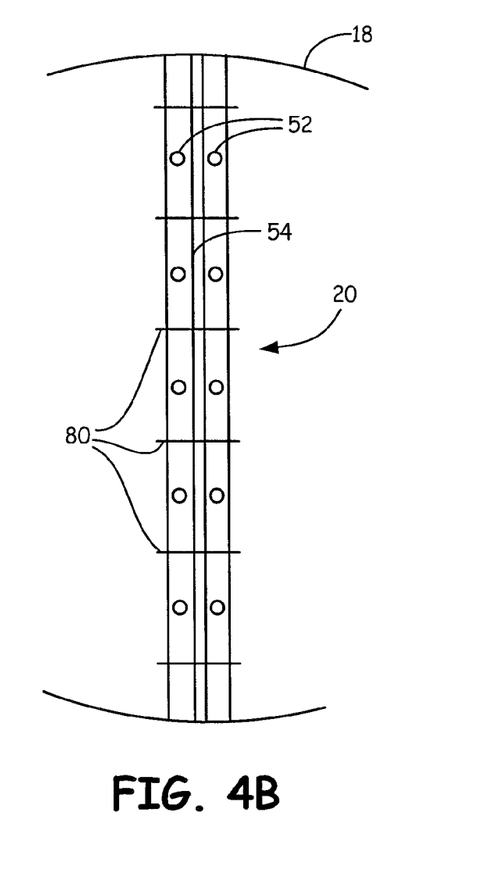
FIG. 4B is a rear plan view of the averaging pitot tube shown in FIG. 1 and illustrates example boundary layer fences.
Figure 4C:
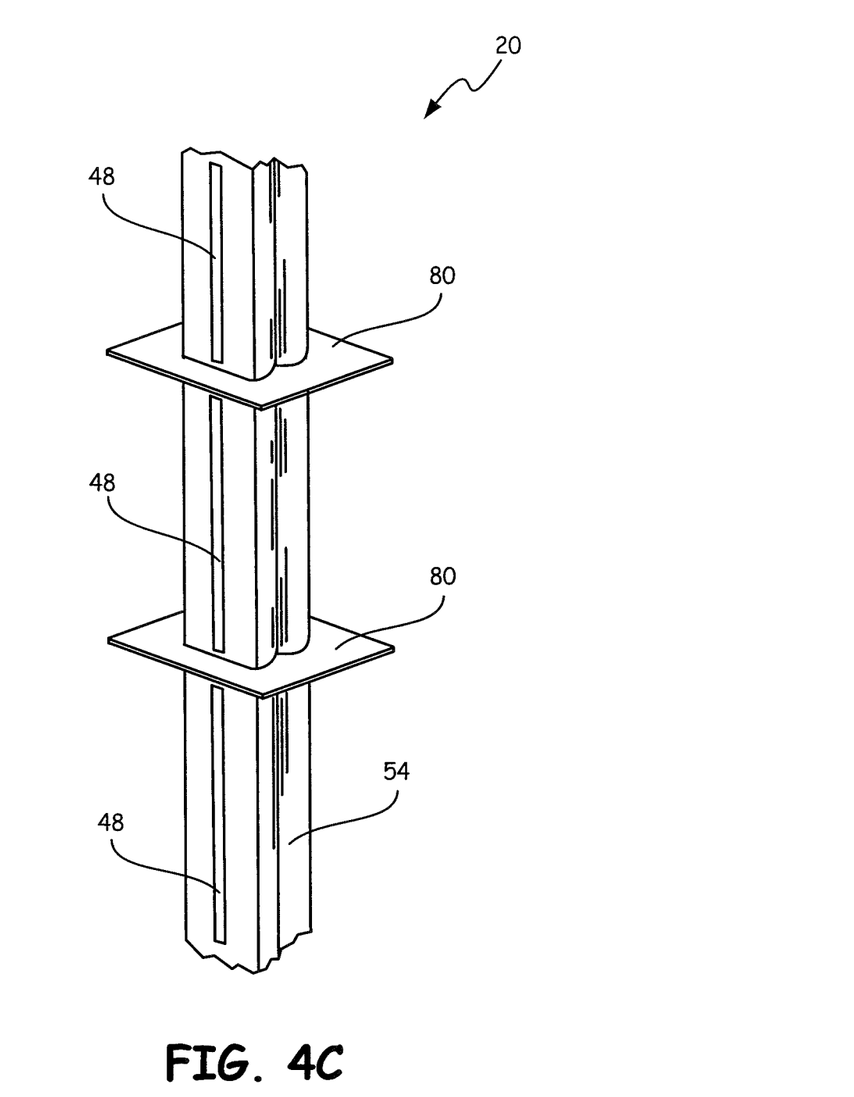
FIG. 4C is a perspective view of the averaging pitot tube shown in FIG. 1 and illustrates example boundary layer fences.

In addition to the low frequency oscillations individual vortices exhibit, there are also timing variations of the vortices as viewed along the length of the probe. FIG. 3F are graphs of amplitude versus time for vortices 33-1 and 33-2. As illustrated in FIG. 3F, there is a timing offset between these vortices. The temporal shift illustrated in FIG. 3F can introduce pressure variations in the plenums of probe 20 which result in errors in flow measurements. As discussed below in more detail, boundary layer fences can be positioned proximate probe 20 to reduce these temporal variations and thereby increase flow measurement accuracy. FIGS. 4A, 4B, and 4C illustrate one example embodiment of such boundary layer fences.

FIG. 4A is a front plan view showing the leading edge of probe 20 and FIG. 4B is a rear plan view showing the trailing edge of probe 20. In FIG. 4A, upstream openings 48 are spread along the span of the upstream facing side of probe 20.

Similarly, in FIG. 4B, openings 52 are spread along the span on the downstream facing side of probe 20 on either side of an optional downstream element 54 of probe 20. In FIGS. 4A and 4B, a plurality of vortex shedding stabilizing boundary layer fences 80 are shown and operate as described below in more detail. FIG. 4C is a perspective view of probe 20 and illustrates one example configuration of boundary layer fences 80 which extend around the outer circumference of probe 20.

The boundary layer fences 80 shown in FIGS. 4A-C act to disrupt the external pressure communication along the span of the probe 20. This allows the fluid to behave as if it is confined to a geometry that is within the coherence length. This acts to regularize the vortex shedding. Appropriate sizing of the fences and opening locations will then make the vortex shedding more uniform along the span of the probe 20 resulting in a more repeatable differential pressure. Further, in addition to sizing of the boundary layer fences 80 and the location of the openings 48, 52, the width of the probe 20 can be adjusted at various points to enhance the regularity of the vortex shedding. This is most important near the pipe walls where the velocity is slightly lower. The boundary layer fences 80 which are nearer to the walls of the pipe can help minimize these effects. In one aspect, the size and/or configuration of the boundary layer fences 80 vary along the span of the probe 20. Although the boundary layer fences 80 are shown as flat elements, any appropriate configuration may be used. Further, the spacing, location, size and shape of the boundary layer fences 80 may be changed as desired.

Figure 5A:
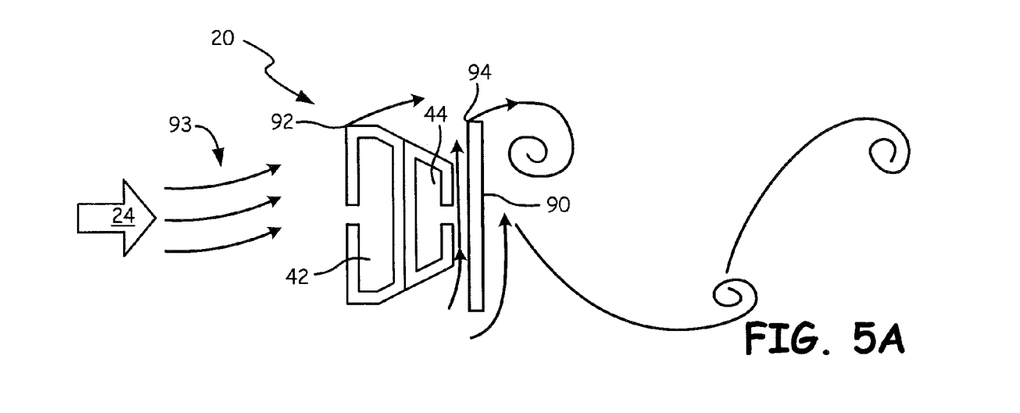
FIGS. 5A and 5B are top cross sectional views of an averaging pitot tube including a vortex shedding stabilizer arranged as a plate positioned downstream from the averaging pitot tube.
Figure 5B:
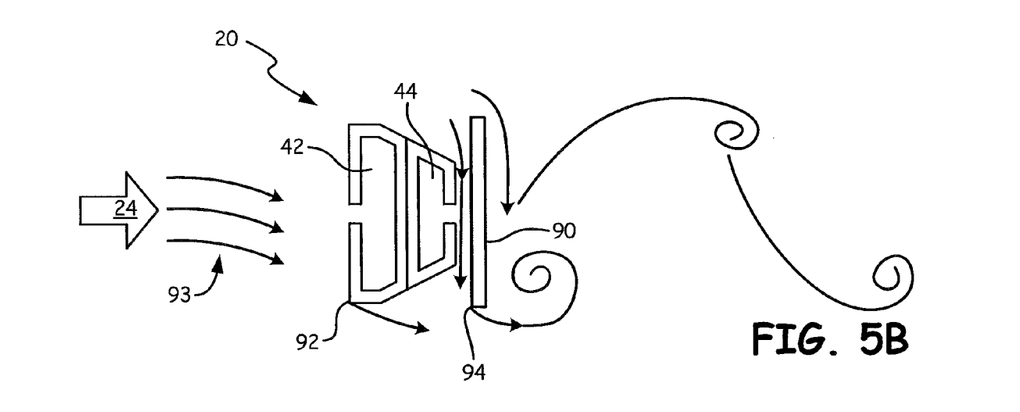
Figure 5C:
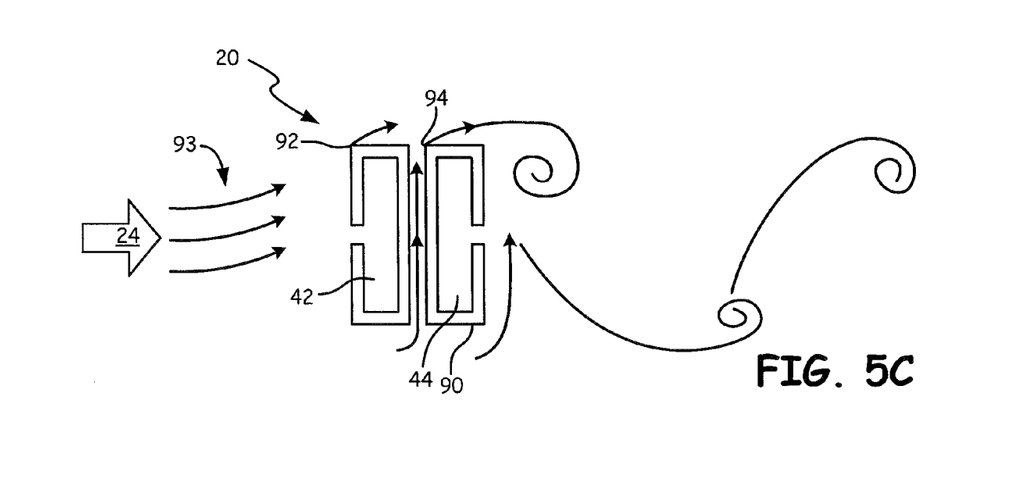
FIG. 5C is a top cross sectional view of another configuration of an averaging pitot tube with a downstream plate.

FIGS. 5A and 5B show an example downstream element for improving the coherence of the vortex shedding and thereby reduce variations in the differential pressure measurement due to the low frequency components shown in FIGS. 3B and 3C. FIGS. 5A and 5B are top cross-sectional views of one configuration of probe 20 showing the upstream plenum 42 and the downstream plenum 44. A trapezoidal APT is illustrated, however, the shape may be varied as desired. Downstream from the APT is a vortex shedding stabilizer arranged as plate 90 attached to the APT at several points but allowing flow to pass between plate 90 and the probe 20. Note that downstream plenum 44 can be carried by plate 90. In such a configuration, the pressure ports which open from the plenum into the process fluid would be located on the downstream side of the plate 90. Such a configuration is illustrated in FIG. 5C in which plate 90 is downstream of plenum 42 and forms plenum 44. Initially, as the flow approaches the probe 20, an upstream oscillation 93 occurs as the flow laterally oscillates across the face of the probe. The flow initially separates from the leading edges 92 of the APT to form vortices. Before they are fully formed, the flow separates again from the corners 94 of the downstream plate 90. Flow visualization experiments and prototypes have shown that such configurations produce extremely regular (i.e., smaller standard deviation of the vortex frequency at a given flow rate) and strong vortices with a strong cross flow (i.e., in the vertical direction in FIGS. 5A and 5B) between the APT 20 and the plate 90. As shown in FIGS. 5A and 5B, the upstream 42 and downstream 44 plenum chambers measure the stagnation pressure on the respective upstream face and the pressure between the APT and plate on the downstream side. The formation of vortices oscillates between opposing sides of the probe 20. In FIG. 5A, the vortex is formed towards the top of the page which causes fluid to flow between the probe 20 and the plate 90 in a direction from the bottom of the page to the top of the page. In contrast, in FIG. 5B, vortices are formed toward the bottom of the page causing the fluid between probe 20 and plate 90 to flow in a direction toward the bottom of the page. This flow between the probe 20 and the plate 90 oscillates in a stable manner thereby eliminating the errors in flow measurements discussed above due to unstable low frequency pressure oscillations $fm_1$ and $fm_2$.

Figure 6:
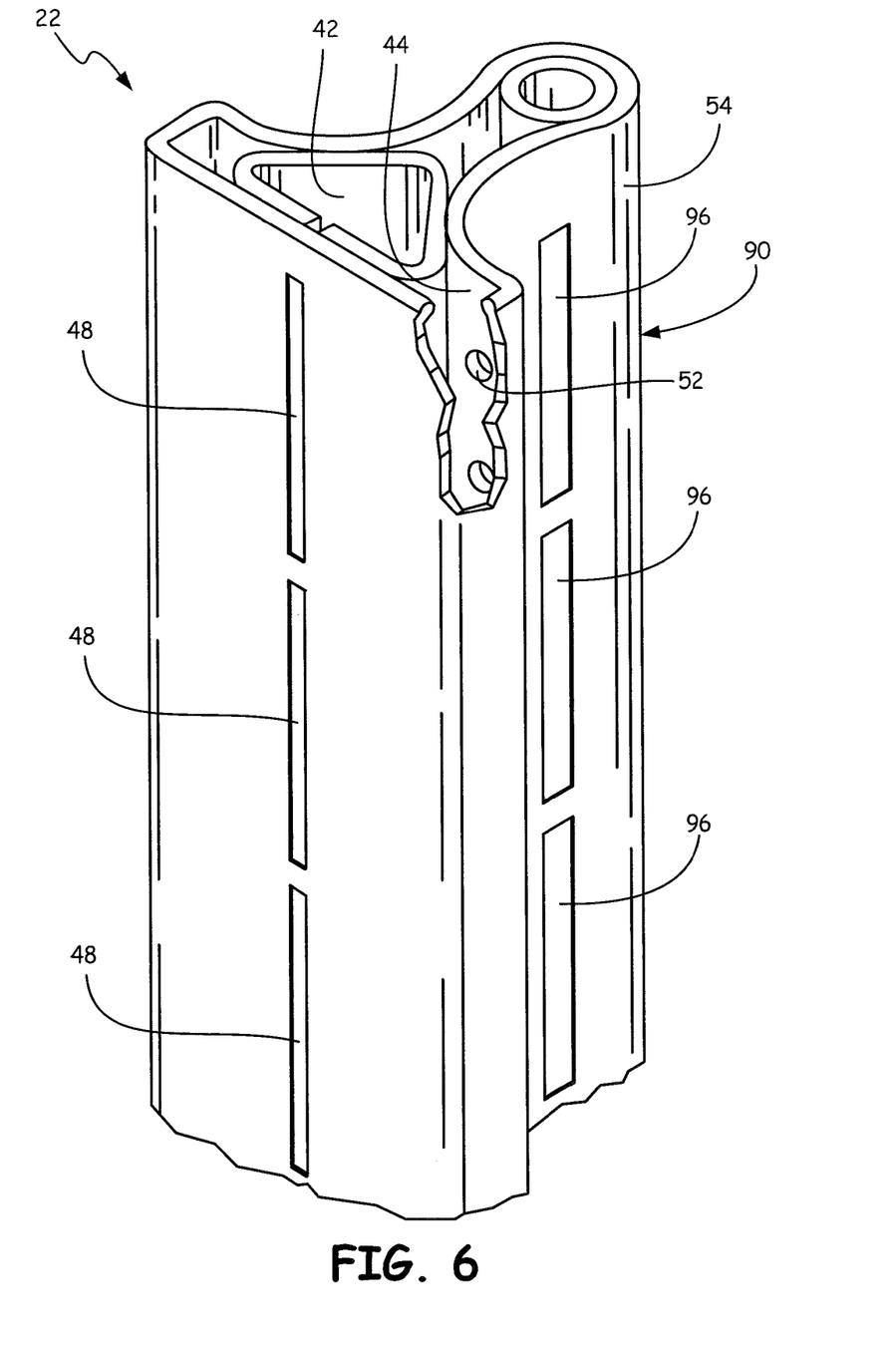
FIG. 6 is a perspective view of another example embodiment of a vortex shedding stabilizer.

FIG. 6 is a perspective view of averaging pitot tube probe 20 showing another example embodiment of the configuration shown in FIG. 5. In FIG. 6, a plurality of openings 96 are arranged along the span of the downstream element 54. As illustrated in FIG. 6, the downstream element 54 forms an elongate rib of the T-shape of the probe 20. The opening 96 extends between opposed sides of the downstream element 54 and allows fluidic communication therebetween. This operates in a manner similar to that of the spacing between probe 20 and plate 90 illustrated in FIGS. 5A and 5B.

In one configuration, to reduce fluctuations in the pressure due to the enhanced vortices from a configuration such as that shown in FIGS. 5A and 5B, a restriction may be placed between the plenum chambers 42, 44 and the pressure sensor 28. Such a restriction should be selected as to not degrade the time response of the APT/DP sensor system and reduce the ability of the APT to detect actual flow changes.

Although the present invention has been described with reference to preferred embodiments, workers skilled in the art will recognize that changes may be made in form and detail without departing from the spirit and scope of the invention. As used herein, the term "pitot tube" refers generally to the probe inserted into the fluid flow. The "pitot tube" does not require internal passageways to conduct pressures from within the flow of process fluid to an external pressure sensor. In accordance with the present invention, a vortex shedding stabilizer is positioned in the flow of process fluid proximate the elongate probe. The vortex shedding stabilizer may be of any configuration and includes the boundary layer fences 80,82 (FIGS. 4A-C) as well as the external plate (downstream element) 90 (FIGS. 5A-C and 6). However, the present invention includes any vortex shedding stabilizer configuration and is not limited to those illustrated herein. In one configuration, a combination of a boundary layer fence 80 and an external plate 90 may be used to further improve the differential pressure measurement. The averaging pitot tube illustrated herein has a "T" shape. In FIG. 6, the openings 96 are shown extending through a base of the "T" shape whereby element 54 provides a downstream element. The differential pressure sensor can be formed of a single pressure sensor or use multiple pressure sensors.

What is claimed is:

1. A differential pressure based flow measurement system, comprising:

a differential pressure sensor having a pressure sensor output which is related to flow of process fluid;

an elongated probe coupled to the pressure sensor configured to be inserted into a conduit which carries a flow of process fluid having a cross section arranged in a "T" shape having an upstream portion at a top of the "T" and generally perpendicular to the flow and the trailing portion which extends in a direction generally parallel with the flow;

an upstream plenum in the upstream portion of the probe having at least one upstream opening coupled to the pressure sensor to thereby apply an upstream pressure to the pressure sensor;

a downstream plenum in the downstream portion of the probe having at least one downstream opening coupled to the pressure sensor to thereby apply a downstream pressure to the pressure sensor;

a vortex shedding stabilizer positioned proximate the elongated probe and in the flow of process fluid, the vortex shedding stabilizer configured to stabilize vortex shedding proximate the elongated probe; and measurement circuitry coupled to the differential pressure sensor configured to measure flow of the process fluid based upon the pressure sensor output from the differential pressure sensor.

2. The apparatus of claim 1, wherein the vortex shedding stabilizer comprises at least one boundary layer fence.

3. The apparatus of claim 2, wherein the boundary layer fence comprises a planar surface arranged generally parallel with a direction of the flow of process fluid.

4. The apparatus of claim 2, including a plurality of boundary layer fences positioned along a length of the elongated probe.

5. The apparatus of claim 4, wherein the upstream plenum includes a plurality of upstream openings and wherein the plurality of boundary layer fences are positioned between the upstream openings.

6. The apparatus of claim 2, wherein the boundary layer fence comprises a flat plate which extends from the upstream face of the elongated probe to the downstream face of the elongated probe and is arranged perpendicular to a longitudinal axis of the elongated probe.

7. The apparatus of claim 1, wherein the vortex shedding stabilizer comprises a downstream element.

8. The apparatus of claim 7, wherein the downstream element comprises a plate adjacent the downstream plenum.

9. The apparatus of claim 7, wherein the downstream element extends in a direction perpendicular to the flow of process fluid.

10. The apparatus of claim 9, wherein the downstream element extends in a direction generally parallel with the elongated probe.

11. The apparatus of claim 7, wherein the downstream plenum is carried in the downstream element.

12. The apparatus of claim 7, wherein an opening between the elongated probe and the downstream element allows fluidic communication therebetween.

13. The apparatus of claim 1, wherein the elongated probe comprises an averaging pitot tube.

14. A method of measuring flow of process fluid based upon a differential pressure, comprising:

placing an elongated probe into a conduit which carries the flow of process fluid, the probe having in upstream face and downstream face having a cross section arranged in a "T" shape having an upstream portion at a top of the "T" and generally perpendicular to the flow and the trailing portion which extends in a direction generally parallel with the flow;

coupling a differential pressure sensor to an upstream pressure with respect to the elongate probe and a downstream pressure with respect to the elongated probe to measure a differential pressure;

measuring the flow of process fluid based upon the upstream pressure and the downstream pressure based upon the measured differential pressure; and stabilizing vortex shedding oscillations which form in the process fluid as the process fluid moves passed the elongated probe with a vortex stabilizer placed proximate the elongated probe.

15. The method of claim 14, wherein stabilizing the vortex shedding oscillations comprises placing at least one boundary layer fence proximate the elongated probe.

16. The method of claim 15, wherein the boundary layer fence comprises a planar surface arranged generally parallel with a direction of the flow of process fluid.

17. The method of claim 15, including providing a plurality of boundary layer fences along a length of the elongated probe.

18. The method of claim 17, wherein the elongated probe includes an upstream plenum having a plurality of upstream openings and wherein the plurality of boundary layer fences are positioned between the upstream openings.

19. The method of claim 17, wherein the boundary layer fence comprises a flat plate which extends from the upstream face of the elongated probe to the downstream face of the elongated probe and is arranged perpendicular to a longitudinal axis of the elongated probe.

20. The method of claim 14, wherein stabilizing the vortex shedding oscillations comprises placing a downstream element proximate the elongated probe.

21. The method of claim 20, wherein the downstream element comprises a plate connected adjacent the downstream plenum.

22. The method of claim 20, wherein the downstream element extends in a direction perpendicular to flow of process fluid.

23. The method of claim 20, wherein the downstream element extends in a direction generally parallel with the elongated probe.

24. The method of claim 20, wherein the downstream element includes a plenum which couples the downstream pressure to the pressure sensor.

25. The method of claim 20, wherein an opening between the elongated probe and the downstream element allows fluidic communication therebetween.

26. The method of claim 14, wherein the elongated probe comprises an averaging pitot tube.

27. An averaging pitot tube configured to be inserted into a conduit for use in measuring a flow of a process fluid in the conduit having a cross section arranged in a "T" shape having an upstream portion at a top of the "T" and generally perpendicular to the flow and the trailing portion which extends in a direction generally parallel with the flow, comprising:

an upstream plenum in the upstream portion of the averaging pitot tube having at least one upstream opening configured to couple to a pressure sensor to thereby apply an upstream pressure to the pressure sensor;

a downstream plenum in the downstream portion of the averaging pitot tube having at least one downstream opening configured to couple to the pressure sensor to thereby apply a downstream pressure to the pressure sensor; and a vortex shedding stabilizer positioned in the flow of the process fluid comprising an opening which extends through the trailing portion of the "T" in a direction which is perpendicular to the flow configured to stabilize vortex shedding.

28. The apparatus of claim 27, wherein the vortex shedding stabilizer further includes a boundary layer fence.

29. The apparatus of claim 27, wherein the vortex shedding stabilizer further includes a downstream element.

* * * * *